(12) United States Patent
Saheb

(10) Patent No.: US 12,432,000 B2
(45) Date of Patent: Sep. 30, 2025

(54) SYNCHRONIZING COMMUNICATION CHANNELS BETWEEN DIGITAL FRONT-END PROCESSORS

(71) Applicant: Analog Devices, Inc., Wilmington, MA (US)

(72) Inventor: Hakim Saheb, Reading, MA (US)

(73) Assignee: Analog Devices, Inc., Wilmington, MA (US)

( * ) Notice: Subject to any disclaimer, the term of this patent is extended or adjusted under 35 U.S.C. 154(b) by 393 days.

(21) Appl. No.: 18/021,363

(22) PCT Filed: Jul. 21, 2021

(86) PCT No.: PCT/US2021/042453
§ 371 (c)(1),
(2) Date: Feb. 14, 2023

(87) PCT Pub. No.: WO2022/020404
PCT Pub. Date: Jan. 27, 2022

(65) Prior Publication Data
US 2024/0039652 A1     Feb. 1, 2024

Related U.S. Application Data

(60) Provisional application No. 63/054,981, filed on Jul. 22, 2020.

(51) Int. Cl.
*H04J 3/06*     (2006.01)
*H04L 49/90*    (2022.01)

(52) U.S. Cl.
CPC ............ *H04J 3/0685* (2013.01); *H04L 49/90* (2013.01)

(58) Field of Classification Search
None
See application file for complete search history.

(56) References Cited

U.S. PATENT DOCUMENTS

| | | |
|---|---|---|
| 7,720,077 B1 | 5/2010 | Healy et al. |
| 8,019,940 B2 | 9/2011 | Flynn et al. |
| 8,073,027 B2 | 12/2011 | Deladurantaye et al. |
| 2011/0035522 A1 | 2/2011 | Tan et al. |
| 2014/0023048 A1* | 1/2014 | Vu ............................ H04B 7/26 370/336 |

OTHER PUBLICATIONS

Extended European Search Report issued in European Patent Application No. 21846998.9, dated Aug. 2, 20224.
International Search Report issued in International Application No. PCT/US2021/042453, dated Dec. 8, 2021.
Written Opinion issued in International Application No. PCT/US2021/042453, dated Dec. 8, 2021.

* cited by examiner

*Primary Examiner* — Kouroush Mohebbi
(74) *Attorney, Agent, or Firm* — Knobbe, Martens, Olson & Bear, LLP

(57) ABSTRACT

A digital front end processor is proposed that includes a transmit channel and/or a receive channel. The digital front end processor may be a part of a multi-antenna wireless communication system or any other system including multiple data channels for which data output is to be in synchronization. The digital front end processor includes a data buffer to receive input data in synchronization with a first strobe signal and generate output data based in the input data. The digital front end processor is to synchronize the output data of transmit channels or receive channels of a plurality of digital front end processors based on a data delay applied to the input data.

20 Claims, 7 Drawing Sheets

SYNCHRONIZING COMMUNICATION CHANNELS BETWEEN DIGITAL FRONT-END PROCESSORS

RELATED APPLICATION

This application claims the benefit of and priority to U.S. Provisional Patent Application No. 63/054,981 entitled "MULTI-CHIP SYNCHRONIZATION OF SSI INTERFACES" and filed Jul. 22, 2020, which is incorporated herein by reference in its entirety.

TECHNICAL FIELD OF THE DISCLOSURE

The present disclosure relates generally to digital front-end processors. In particular, the present disclosure relates to synchronization of communication channels between digital front-end processors, e.g., in transceiver devices.

BACKGROUND

Data processing systems increasingly use multiple communication paths to transmit and/or receive data. Some data processing systems may require output data on the communication paths to be in timing synchronization.

For example, wireless communication systems increasingly use multiple radio frequency (RF) transmission paths to transmit and receive over multiple antennas to achieve diversity benefits such as increased signal throughput, reliability and/or quality. A multi-antenna base station may have different signal path delays for the transmit or receive signal paths between the radio base station and the radio equipment antennas. In such cases, the different signal path delays can present challenges in meeting timing alignment requirements between radio transmitter branches.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

The systems, methods and devices of this disclosure each have several innovative aspects, no single one of which is solely responsible for all of the desirable attributes disclosed herein. Details of one or more implementations of the subject matter described herein are set forth below and the accompanying drawings.

Figure 1:
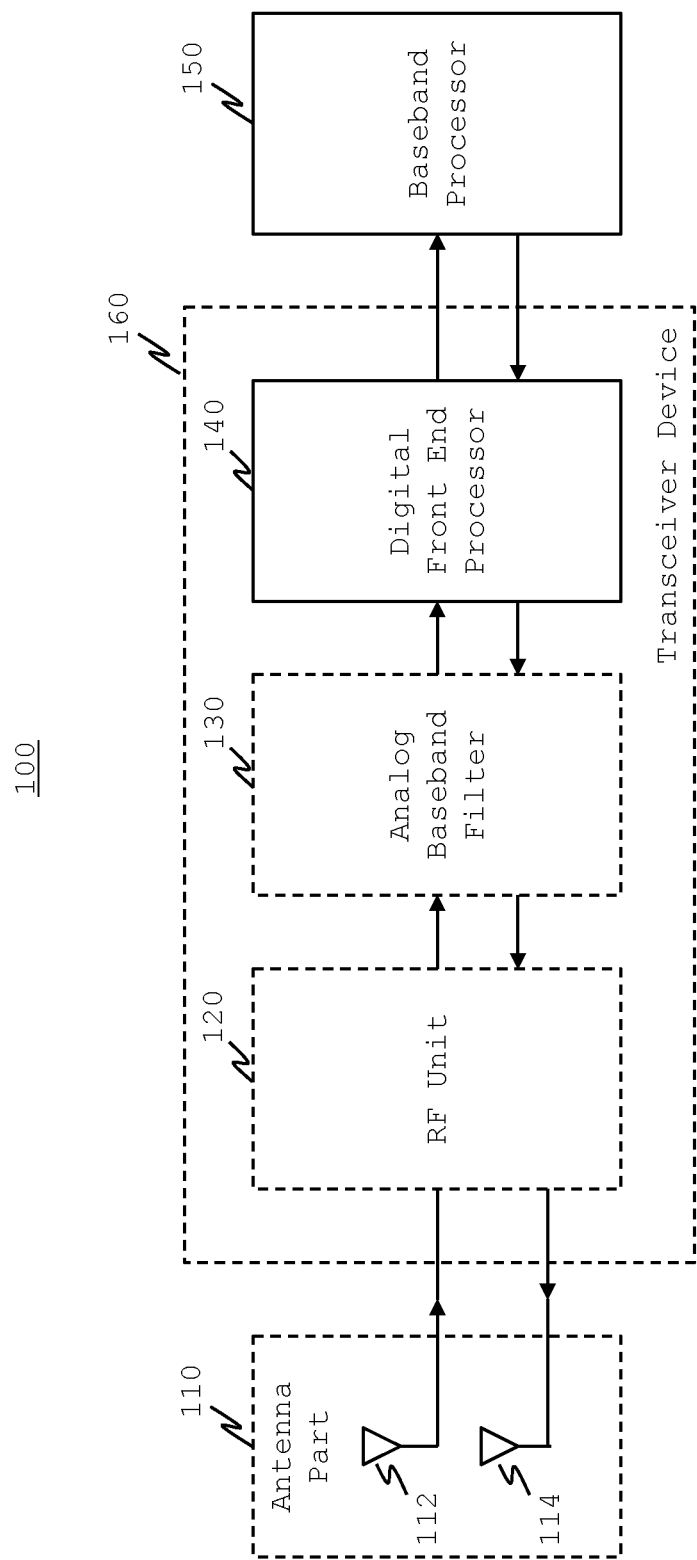
FIG. 1 is an illustrative block diagram of a multi-antenna wireless communication system, according to some embodiments of the present disclosure.

The present disclosure provides a solution for aligning the transmission and/or reception of signal data blocks across multiple signal paths of digital front-end processors in a data processing system, e.g., in a multi-antenna wireless communication system. With reference to FIG. 1, the data processing system may include a baseband processor 150 and a digital front-end processor 140. The data processing system of the present disclosure typically includes multiple digital front-end processors 140, e.g., one digital front-end processor for each signal path.

A non-limiting example of a data processing systems is a sensor system for processing sensor data to and/or from one or more sensors of any kind. Another non-limiting example of a data processing system is an actuator system for processing data to and/or from one or more actuators of any kind. Another non-limiting example of a digital processing system is a multi-antenna wireless communication system for transmitting and/or receiving data signals.

In the example of FIG. 1, the data processing system may be part of an example multi-antenna wireless communication system 100. The dashed blocks in FIG. 1 illustrate parts added to baseband processor 150 and digital front-end processor 140 for forming the multi-antenna wireless communication system 100. The multi-antenna wireless communication system 100 may include an antenna part 110 including one or more transmitter (Tx) antennas 112 and one or more receiver (Rx) antennas 114, a RF unit 120, an analog baseband filter part 130, digital front-end processor 140 and baseband processor 150.

The antenna part 110 may include one or more power amplifiers (not shown) for amplifying analog signals before transmission and one or more attenuators (not shown) for reducing power of received signals.

The RF unit 120 may include one or more mixers (not shown) for mixing the received/transmitted signals with a local oscillator signal.

The analog baseband filter part 130 may include one or more low-pass filters or transmitter baseband filters (not shown) to, e.g., remove Nyquist images.

The digital front-end processor 140 typically provides buffer functionality, e.g., in the form of first-in-first-out (FIFO) buffers. Furthermore, the digital front-end processor 140 typically provides signal synchronization functionalities. In some embodiments, the digital front-end processor 140 may be implemented as a single chip design. Examples of the digital front-end processor 140 will be discussed in more detail with reference to FIG. 2 and FIG. 4.

The RF unit 120, analog baseband filter part 130 and the digital front-end processor 140 may form a transceiver device 160. In some embodiments, the transceiver device 160 may be realized as a single chip design. The baseband processor 150 may be realized as a baseband integrated circuit (BBIC). The baseband processor 150 may include a digital signal processor (DSP). In some embodiments, the baseband processor 150 may be implemented as an application specific integrated circuit (ASIC). In some embodiments, the baseband processor 150 may be implemented as a field-programmable gate array (FPGA).

In some embodiments, the digital front-end processor 140 may provide advance timing alignment of user data sent over different signal paths so that all user data blocks may be processed in synchronization, e.g., enabling signals to arrive at their corresponding antennas at a specified timeslot (e.g., at the next radio frame boundary).

The digital front-end processor 140 may be a part of a transceiver device 160 that includes of a number of transmit and receive channels. These channels may communicate with baseband processor 150 to transmit and receive data. Data transfers within the transceiver device 160 are preferably synchronous and preferably insure constant deterministic latency each time the multi-antenna wireless communication system 100 is powered on. Furthermore, the multi-antenna wireless communication system 100 may include multiple transceiver devices 160 that may need to be synchronized for constant deterministic latency.

In some embodiments, the present disclosure uses synchronous FIFOs and a strobe signal input to achieve synchronization, e.g., synchronous serial interface (SSI) synchronization, for transmit and receive data transfers. A global trigger pulse and the strobe signal input may be used to determine a start time of FIFO operations at different digital front-end processors 140. Thus, both a deterministic latency as well as a fix latency delay from one power on to next may be achieved.

In some embodiments, from the digital front-end processor 140 to the baseband processor 150, a global trigger pulse, e.g., a multi-chip signal (MCS), may be used to start FIFO read operation. This global trigger pulse may be internally delayed by a trigger delay to match, e.g., a baseband processor MCS detection delay. The thus obtained delayed trigger signal, e.g., delayed MCS, and resulting delayed output data may allow reduced FIFO sizes.

In some embodiments, from the baseband processor 150 to the digital front-end processor 140, an internal trigger pulse, e.g., an internal MCS pulse, may be used to start FIFO read operation. This MCS pulse may be internally delayed by a trigger delay to match a strobe pulse delay of the baseband processor 150. The thus obtained delayed trigger signal, e.g., delayed MCS, and resulting delayed output data may allow FIFO sizes to be short.

As will be appreciated by one skilled in the art, aspects of the present disclosure may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon.

The following detailed description presents various descriptions of specific certain embodiments. However, the innovations described herein can be embodied in a multitude of different ways, for example, as defined and covered by the claims and/or select examples. In the following description, reference is made to the drawings, where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the present disclosure, if used, the terms "substantially," "approximately," "about," etc., may be used to generally refer to being within +/−20% of a target value, e.g., within +/−10% of a target value, based on the context of a particular value as described herein or as known in the art. For the purposes of the present disclosure, the phrase "A and/or B" or notation "A/B" means (A), (B), or (A and B). For the purposes of the present disclosure, the phrase "A, B, and/or C" or notation "A/B/C" mean (A), (B), (C), (A and B), (A and C), (B and C), or (A, B, and C).

Other features and advantages of the disclosure will be apparent from the following description and the claims.

MCS Signals

In some embodiments, a global signal, such as MCS may be input to the transceiver devices 160, including the baseband processor 150, using a single reference device clock to synchronize internal clock generation of each transceiver device. The MCS may be used to, e.g., synchronize phase locked loop (PLL) circuits in the transceiver devices 160. Besides of synchronizing the PLL in each transceiver device 160 (if it is used), data interfaces are preferably synchronized if interface clocks, e.g., SSI clocks, are not phase locked with internal clocks. The present disclosure proposed use of a strobe signal to synchronize the data interfaces in response to a global signal, such as a MCS signal.

Example Rx Part of a Digital Front-End Processor

Figure 2:
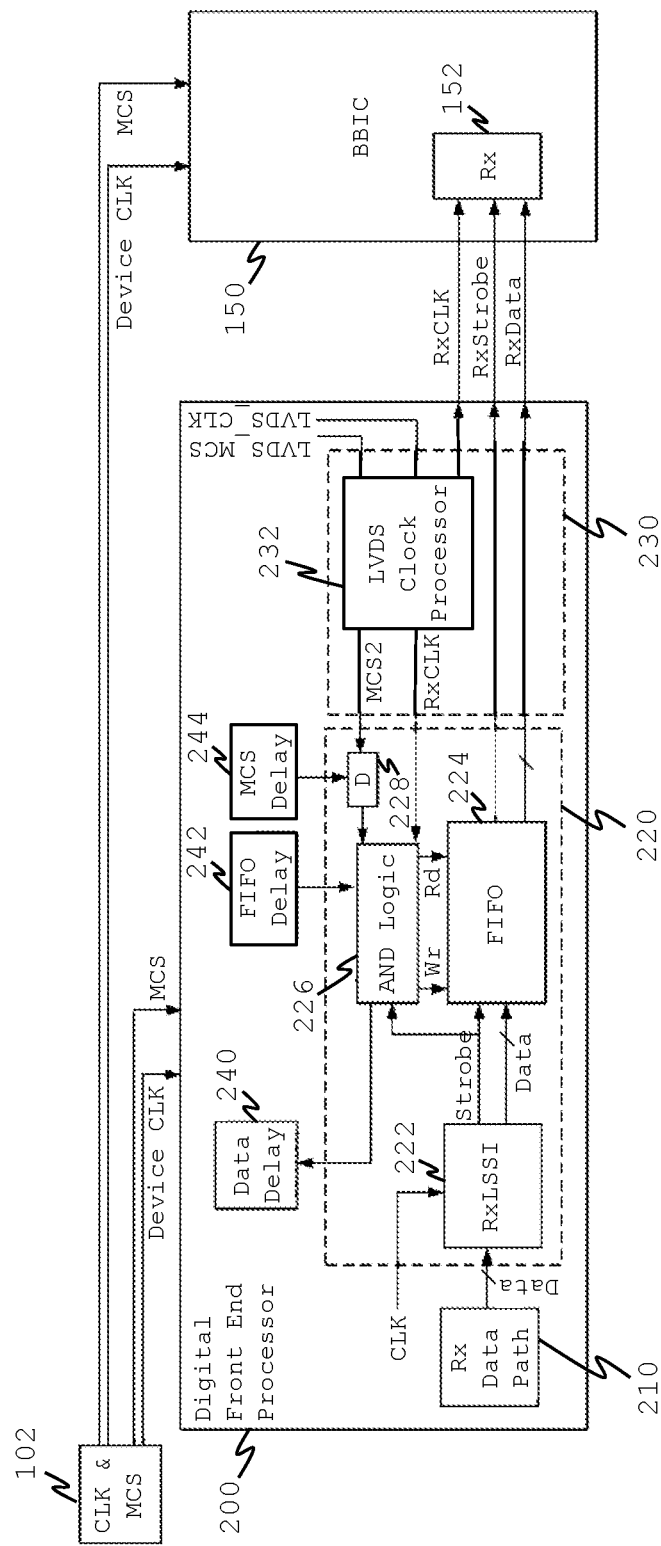
FIG. 2 is an illustrative block diagram of a receiver part of a digital front-end processor, according to some embodiments of the present disclosure.

The digital front-end processor 140 may support high data rate and low data rate interfaces using, e.g., configurable complementary metal oxide semiconductor (CMOS) based or low voltage differential signaling (LVDS) based SSI. In FIG. 2, an example LVDS based digital front-end processor 200 is shown, according to some embodiments of the disclosure. Digital front-end processor 200 may be an example of a digital front-end processor 140 shown in FIG. 1. More particularly, FIG. 2 shows an example of a digital front-end processor 200 that may be used for Rx LVDS SSI synchronization, according to some embodiments of the present disclosure. Digital front-end processor 200 may be part of a multi-antenna wireless communication system, such as multi-antenna wireless communication system 100.

The digital front-end processor 200 may receive device clock signals (depicted 'Device CLK' in FIG. 2) and MCS signals (depicted 'MCS' in FIG. 2) from a clock and MCS signal generator 102 (depicted 'CLK & MCS' in FIG. 2).

The digital front-end processor 200 may include an Rx Data Path 210, which represents the data path with an incoming Rx data signal (depicted 'Data' in FIG. 2), e.g., originating from analog baseband filter part 130 of FIG. 1.

The digital front-end processor 200 may further include a synchronization unit 220. The synchronization unit 220 may include a logic circuit for determining the start time of FIFO read operations based on MCS input signals and a strobe signal, according to some embodiments of the present disclosure. An Rx LVDS SSI (RxLSSI) 222 may receive the Data from the Rx Data Path 210. The RxLSSI may further receive a clock signal (depicted 'CLK' in FIG. 2), which is typically based on the Device CLK signal. The RxLSSI 222 may use the CLK signal to generate a strobe signal (depicted 'Strobe' in FIG. 2) and output the Data in synchronization with the Strobe signal. The Strobe signal may be output to a FIFO buffer 224 and a logic circuit, such as AND Logic 226. The Data may be output to the FIFO buffer 224.

Output of the FIFO buffer 224 may be delayed, resulting in an Rx Strobe signal (depicted 'RxStrobe' in FIG. 2), i.e., a delayed version of the Strobe signal. Output of the FIFO buffer 224 may further include output data (depicted 'RxData' in FIG. 2). The output data may be in synchronization with output data in other digital front-end processors of the transceiver device. The output data may be in synchronization with the RxStrobe signal. Herein, the content of RxData is typically the same as Data. RxStrobe may be delayed such that the start time of FIFO read operations becomes substantially the same for a plurality, possibly all, digital front-end processors 200, e.g., of the multi-antenna wireless communication system.

The start time of FIFO read operations, and therewith the start time of the RxStrobe signal, may be determined by the logic circuit, such as AND Logic 226. AND Logic 226 may receive the Strobe signal from the RxLSSI 222 and a trigger signal, e.g., MCS signal (depicted 'MCS2' in FIG. 2). MCS2 may be based on the MCS signal and may be generated by an LVDS part 230. MCS2 may trigger start of the Strobe signal. The start of the Strobe signal may be delayed by an MCS delay value stored in MCS delay memory 244. More generally, a trigger delay value, such as the MCS delay value, may be stored in a trigger signal delay memory, such as MCS delay memory 244. The start time of the triggered Strobe signal, including the optional MCS delay, may be compared with triggered Strobe signals of one or more other Rx Data Paths. This comparison may result in the determination of a data delay to apply to the Strobe signal. The resulting RxStrobe signal may be the same for the FIFO buffers 224 of all involved digital front-end processors 200 in the multi-antenna wireless communication system.

The data delay may thus determine the start of the RxData signal. The data delay may be expressed in terms of the Device CLK, e.g., an integer number indicative of a number of Device CLK pulses. Alternatively, the data delay may be expressed in terms of a clock signal RxCLK originating from the LVDS part 230, e.g., from a LVDS Clock Processor 232 of the LVDS part 230. RxCLK may be based on the Device CLK signal. The delay value be stored in a data delay memory 240. Different digital front-end processors 200, e.g., of a multi-antenna wireless communication system, may include its own data delay memory 240. Alternatively, a data delay memory 240 may be shared among digital front-end processors.

Applying the data delay to the Strobe signal may result in an optimized strobe signal, i.e., RxStrobe, which, when used by the FIFOs 224 of the digital front-end processors 200 of all involved Rx Data Paths 210, results in substantially the same start time of FIFO 224 read operations in all involved digital front-end processors 200.

In some embodiments the data delay may be applied to the FIFO buffer 224 based on the MCS delay and a FIFO delay. The MCS delay and the FIFO delay may be expressed in terms of the Device CLK or RxCLK, similar to the data delay. E.g., a data delay value representative of the data delay may be determined for a plurality of FIFO buffers 224 of different digital front-end processors 200, as explained above. The data delay value may be stored, e.g., in a Data delay memory 240 of the digital front-end processor 200 or in a shared data delay memory for multiple digital front-end processors. Based on the data delay value, AND Logic 226 may calculate the FIFO delay, e.g., by calculating FIFO delay=Data delay−MCS delay. The thus obtained FIFO delay may be stored in the FIFO delay memory 242, so it may be calculated only once. More generally, a buffer delay value indicative of a buffer delay, such as the FIFO delay, may be stored in a buffer delay memory, such as FIFO delay memory 242. The start time of RxData may then be set by applying the MCS delay and the FIFO delay to the Strobe signal.

As explained above, the start of the Strobe signal may be delayed by the MCS delay value from the MCS delay memory 244. Applying the MCS delay to MCS2 may result in a delay in starting the Strobe signal, thereby delaying the Data signals. The MCS delay may thus be used to reduce the amount of Data signals received at the FIFO buffer 224, possibly reducing the required FIFO buffer size.

LVDS part 230 may include an LVDS Clock Processor 232. LVDS Clock Processor 232 may output the MCS2 signal based on an input LVDS_MCS clock signal. The LVDS_MCS clock signal is typically based on the MCS signal generated by the CLK & MCS signal generator 102. The MCS2 signal may be input to a delay unit 228 (depicted 'D' in FIG. 2), where the MCS delay value from the MCS delay memory 244 may be applied to the MCS2 signal. LVDS Clock Processor 232 may further output the RxCLK signal based on an input LVDS_CLK signal. The LVDS_CLK clock signal is typically based on the Device CLK signal generated by the CLK & MCS signal generator 102. The RxCLK signal may be output to the AND Logic 226 and to a BBIC 150. The RxStrobe and RxData signals from the FIFO buffer 224 may be forwarded to the BBIC 150 by the LVDS part 230. Interfaces between the LVDS part 230 and the synchronization unit 220 and between the LVDS part 230 and the BBIC 150 may be SSI based interfaces.

The BBIC 150 may include a receiver 152 (depicted 'Rx' in FIG. 2). The Rx 152 may receive the RxCLK, RxStrobe and RxData signals from the digital front-end processor 200. The BBIC 150 may further receive the Device CLK and MCS signal from the CLK & MCS signal generator 102.

Example Signal Diagram for an Rx Part of a Digital Front-End Processor

Figure 3:
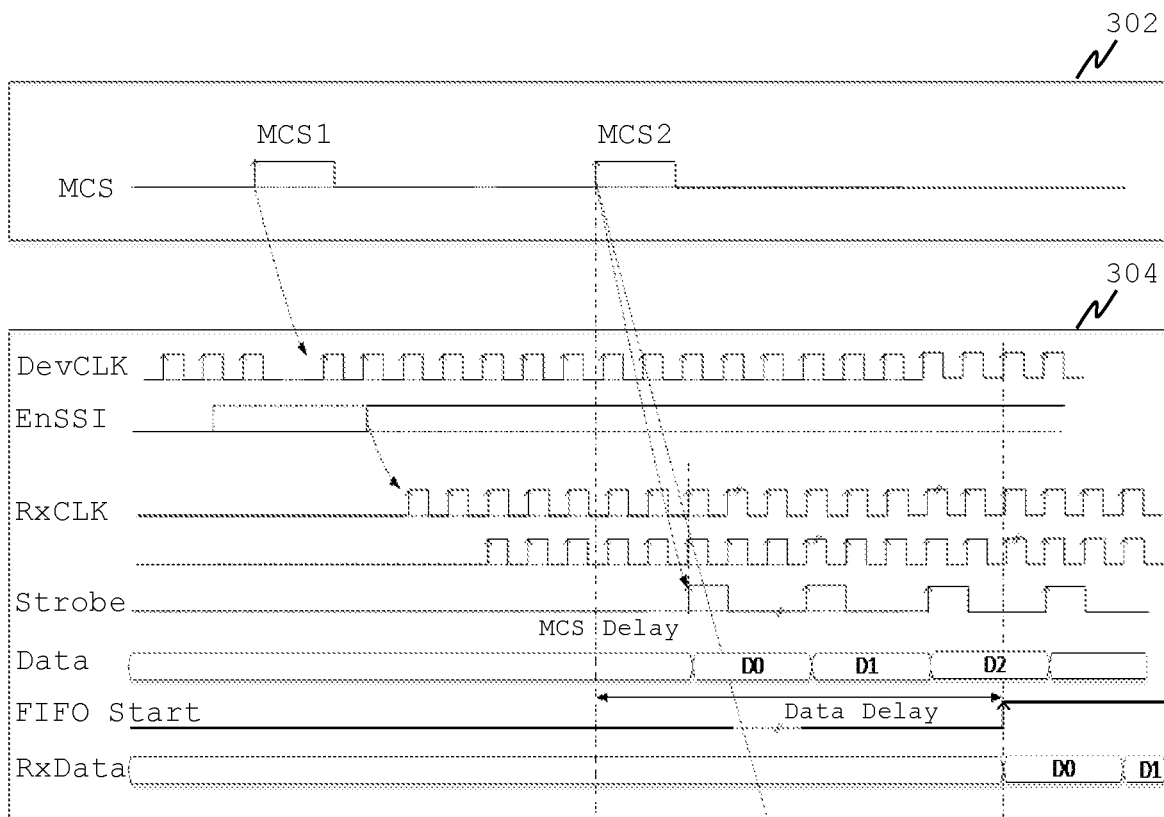
FIG. 3 illustrates a signal diagram at a receiver part of a digital front-end processor, according to some embodiments of the present disclosure.
Figure 3:
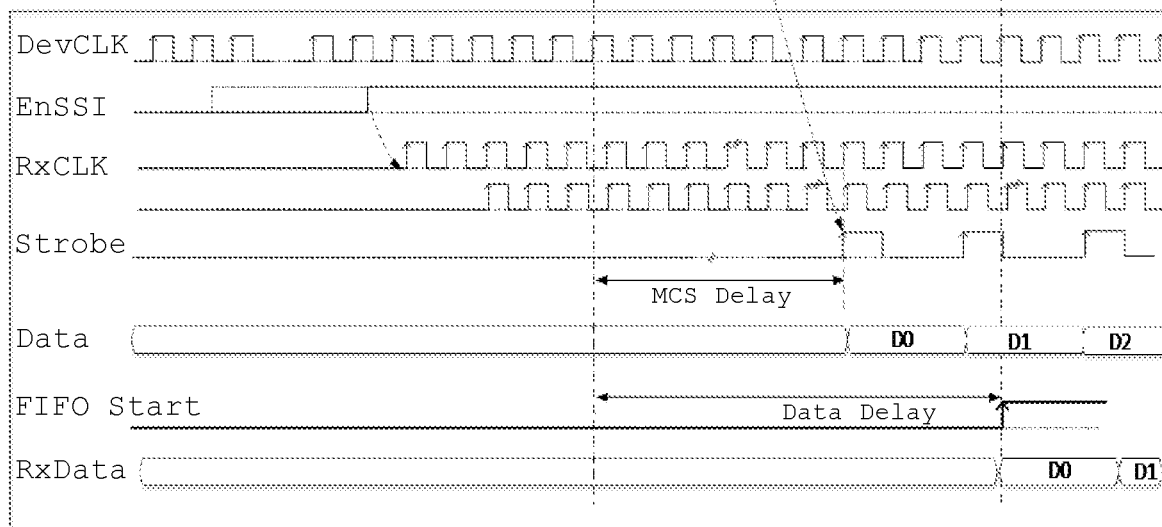

An example of signals involved in the Rx part of a digital front-end processor is shown in the signal diagram 300 of FIG. 3. The signal diagram 300 includes MCS related signals 302, signals 304 in an Rx part of a first digital front-end processor, such as the digital front-end processor 200 shown in FIG. 2, and signals 306 in an Rx part of a second digital front-end processor. The first and second digital frond end processor are typically parts of the same multi-antenna wireless communication system, e.g., multi-antenna wireless communication system 100 of FIG. 1. The present disclosure is not limited to multi-antenna wireless communication system including two Rx parts. There may be any number of Rx parts and any number of digital front-end processors.

There may be various MCS signals involved in triggering clock signals. E.g., as shown in FIG. 3, a first MCS signal MCS1 may trigger start of SSI interfaces by setting an enable SSI (depicted 'EnSSI' in FIG. 3) signal. The EnSSI signal may trigger the LVDS part 230 to start the RxCLK signal. A second MCS signal MCS2 represents the MCS2 signal as generated by the LVDS Clock Processor 232 of FIG. 2.

In the first digital front-end processor 200 (i.e., signals 304), the Device CLK signal (depicted 'DevCLK' in FIG. 3) may be received from the CLK & MCS signal generator 102. When the MCS2 signal is received, an MCS delay may be applied, in this example a delay of two RxCLK pulses, after which the Strobe signal may be started. In synchronization with the Strobe signal, the Data may be received from the RxLSSI 222 in the FIFO buffer 224, where the data samples D0, D1 and D2 will be buffered before being output.

In the second digital front-end processor (i.e., signals 306), the DevCLK signal may be received from the CLK & MCS signal generator 102. When the MCS2 signal is received, an MCS delay may be applied, in this example a delay of six RxCLK pulses, after which the Strobe signal may be started. In synchronization with the Strobe signal, the Data may be received from another RxLSSI 222 in another FIFO buffer 224, where the data samples D0 and D1 will be buffered before being output. Note that the Data and data samples D0 . . . D2 in the second digital front-end processor may be different from the Data and data sampled D0 . . . D2 in the first digital front-end processor.

In the example of FIG. 3, the data delay is the largest for the second digital front-end processor. The data delay to be applied to all Rx parts may therefore be based on the data delay in the second digital front-end processor. The data delay to be applied (depicted 'Data Delay' in FIG. 3) may be stored in the data delay memory 240. Each digital front-end processor may implement the data delay by enabling a FIFO Start signal, which triggers start of the RxData signal in synchronization with an RxStrobe signal (not shown). As shown in FIG. 3, the RxData signal may be synchronized among the digital front-end processors.

Example Tx Part of a Digital Front-End Processor

Figure 4:
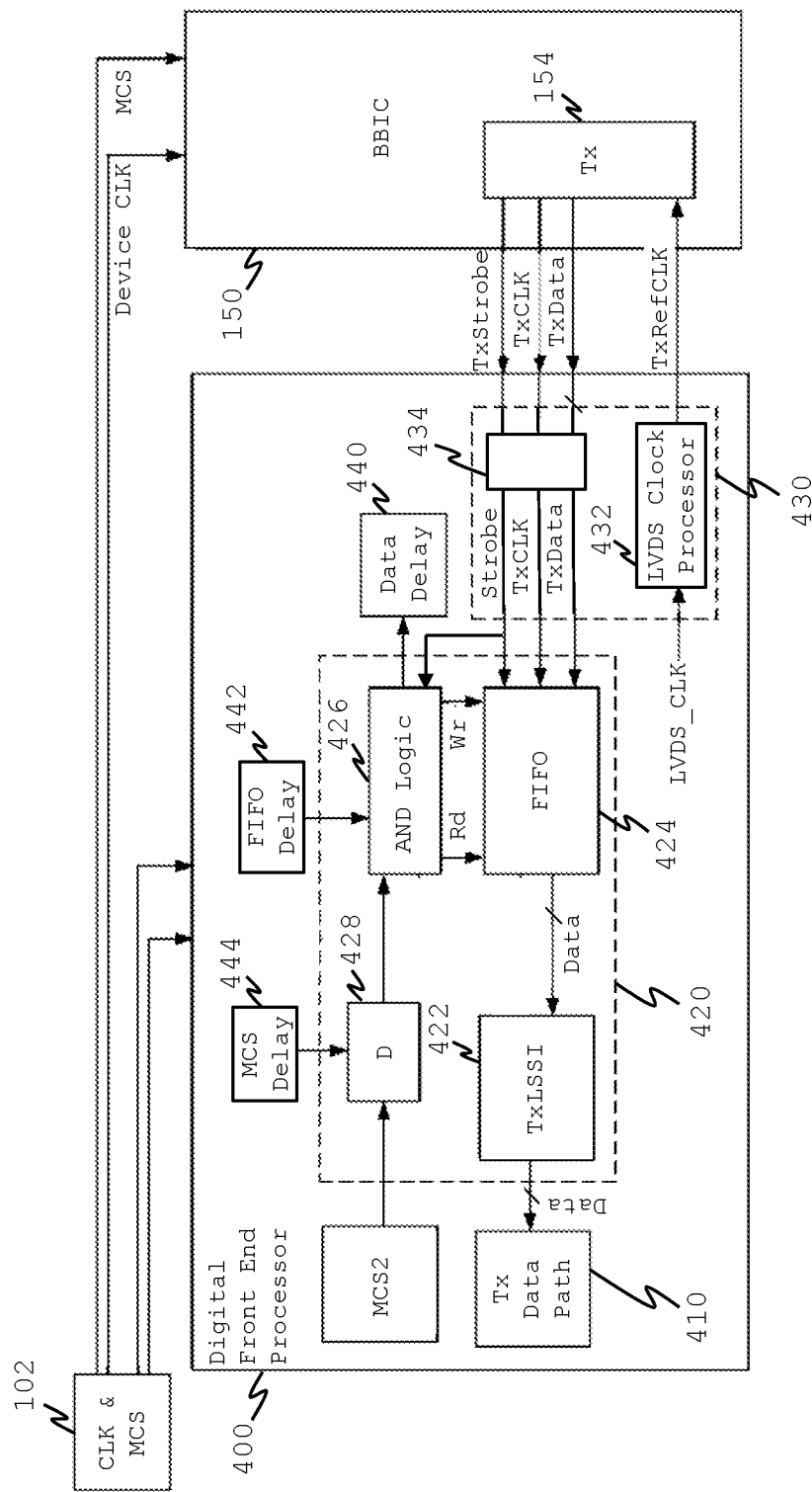
FIG. 4 is an illustrative block diagram of a transmitter part of a digital front-end processor, according to some embodiments of the present disclosure.

In FIG. 4, another example LVDS based digital front-end processor 400 is shown, according to some embodiments of the disclosure. Digital front-end processor 400 may be an example of a digital front-end processor 140 shown in FIG. 1. More particularly, FIG. 4 shows an example of a digital front-end processor 400 that may be used for Tx LVDS SSI synchronization, according to some embodiments of the present disclosure. Digital front-end processor 400 may be part of a multi-antenna wireless communication system, such as multi-antenna wireless communication system 100.

A BBIC, e.g., the BBIC 150 of FIG. 1, may include a transmitter 154 (depicted 'Tx' in FIG. 4). The Tx 154 may output TxCLK, TxStrobe and TxData signals to the digital front-end processor 400. The BBIC 150 may further receive device clock signals (depicted 'Device CLK' in FIG. 4) and MCS signals (depicted 'MCS' in FIG. 4) from a clock and MCS signal generator 102 (depicted 'CLK & MCS' in FIG. 4). The TxCLK signal may be based on the Device CLK signal and/or on a reference clock signal (depicted 'TxRefCLK' in FIG. 4) received from the digital front-end processor 400. The TxRefCLK signal may be based on the Device CLK signal. The TxData signal includes data output by the BBIC 150 in synchronization with the TxStrobe signal, wherein the TxStrobe signal may be in synchronization with the TxCLK signal.

The digital front-end processor 400 may receive the Device CLK and MCS from the clock and CLK & MCS signal generator 102. The digital front-end processor 400 may include a Tx Data Path 410, which represents the data path with an outgoing Tx data signal (depicted 'Data' in FIG. 4), e.g., to analog baseband filter part 130 of FIG. 1.

The digital front-end processor 400 may further include a synchronization unit 420. The synchronization unit 420 may include a logic circuit for determining the start time of FIFO read operations based on MCS input signals and a strobe signal (depicted 'Strobe' in FIG. 4), according to some embodiments of the present disclosure. A Tx LVDS SSI (TxLSSI) 422 may receive data from a FIFO buffer 424 and output the data to the Tx Data Path 410. The data may be received in the TxLSSI 422 in synchronization with data in other digital front-end processors of the transceiver device.

Output of the FIFO buffer 424 may be delayed. Output of the FIFO buffer 424 may include the output data (depicted 'Data' in FIG. 4) in synchronization with the other digital font end processors. Herein, the content of the output data is typically the same as TxData. The strobe signal Strobe may be delayed such that the start time of FIFO read operations becomes substantially the same for a plurality, possibly all, digital front-end processors 400, e.g., of the multi-antenna wireless communication system.

The start time of FIFO read operations may be determined by a logic circuit, such as AND Logic 426. AND Logic 426 may receive the strobe signal Strobe from the BBIC 150, e.g., via a LVDS signal processor 434 of a LVDS part 430. AND Logic 426 may further receive a trigger signal, e.g., MCS signal (depicted 'MCS2' in FIG. 4). MCS2 may be based on the MCS signal. MCS2 may trigger start of the strobe signal at the AND Logic 426. The start of the strobe signal may be delayed at the AND Logic 426 by an MCS delay value stored in MCS delay memory 444, or more generally by a trigger delay value, such as the MCS delay value, stored in a trigger signal delay memory, such as MCS delay memory 444. The start time of the triggered strobe signal in the AND Logic 426, including the optional MCS delay, may be compared with triggered strobe signals of one or more other Tx Data Paths. This comparison may result in the determination of a data delay to apply to the strobe signal Strobe. The resulting strobe signal may be the same for the FIFO buffers 424 of all involved digital front-end processors 400 in the multi-antenna wireless communication system.

The data delay may thus determine the start of the data signal Data. The data delay may be expressed in terms of the Device CLK, e.g., an integer number indicative of a number of Device CLK pulses. Alternatively, the data delay may be expressed in terms of a clock signal TxCLK originating from the BBIC 150. TxCLK may be based on the Device CLK signal. The delay value be stored in a data delay memory 440. Different digital front-end processors 400, e.g., of the multi-antenna wireless communication system may include its own data delay memory 440. Alternatively, a data delay memory 440 may be shared among digital front-end processors.

In some embodiments the data delay may be applied to the FIFO buffer 424 based on the MCS delay and a FIFO delay. The MCS delay and the FIFO delay may be expressed in terms of the Device CLK or TxCLK, similar to the data delay. E.g., a data delay value may be determined for a plurality of FIFO buffers 424 of different digital front-end processors 400, as explained above. The data delay value may be stored, e.g., in a Data delay memory 440 of the digital front-end processor 200 or in a shared data delay memory for multiple digital front-end processors. Based on the data delay value, AND Logic 426 may calculate the FIFO delay, e.g., by calculating FIFO delay=Data delay–MCS delay. The thus obtained FIFO delay may be stored in the FIFO delay memory 442, so it may be calculated only once. More generally, a buffer delay value indicative of a buffer delay, such as the FIFO delay, may be stored in a buffer delay memory, such as FIFO delay memory 442. The start time of outputting the Data from the FIFO buffer 424 may then be set by applying the MCS delay and the FIFO delay to the Strobe signal.

As explained above, the start of the Strobe signal may be delayed in the AND Logic 426 by the MCS delay value from the MCS delay memory 444. Applying the MCS delay to MCS2 may result in a delay in starting the Strobe signal in the AND Logic 426, thereby delaying the Data signals. The MCS delay may thus be used to reduce the amount of TxData signals received at the FIFO buffer 424, possibly reducing the required FIFO buffer size.

The MCS2 signal may be input to a delay unit 428 (depicted 'D' in FIG. 4), where the MCS delay value from the MCS delay memory 444 may be applied to the MCS2 signal.

LVDS part 430 may include an LVDS Clock Processor 432. LVDS Clock Processor 432 may output the TxRefCLK signal based on an input LVDS_CLK clock signal. The LVDS_CLK clock signal is typically based on the MCS signal generated by the CLK & MCS signal generator 102. The TxCLK, TxStrobe and TxData signals from the BBIC 150 may be forwarded to the FIFO buffer 424 by the LVDS signal processor 434, wherein the TxStrobe signal may be forwarded as the strobe signal depicted 'Strobe'. Interfaces between the LVDS part 430 and the synchronization unit 420 and between the LVDS part 430 and the BBIC 150 may be SSI based interfaces.

Example Signal Diagram for a Tx Part of a Digital Front-End Processor

Figure 5:
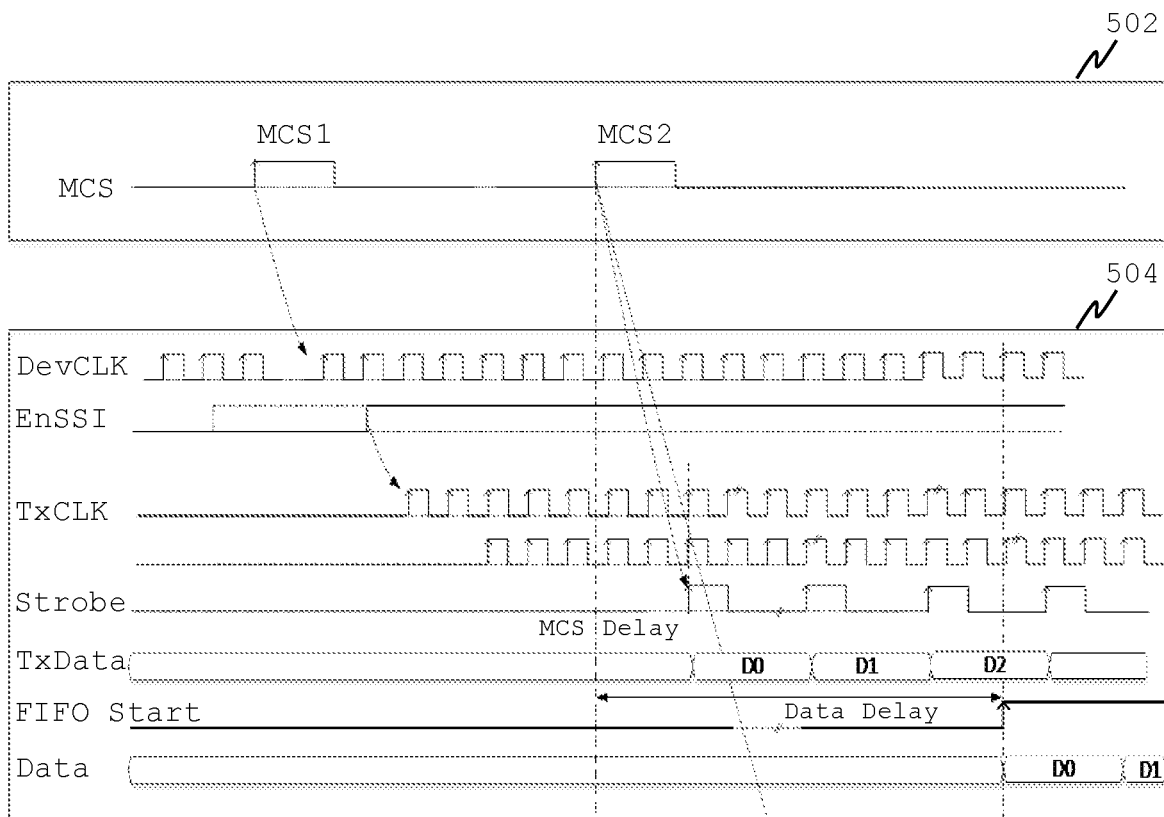
FIG. 5 illustrates a signal diagram at a transmitter part of a digital front-end processor, according to some embodiments of the present disclosure.
Figure 5:
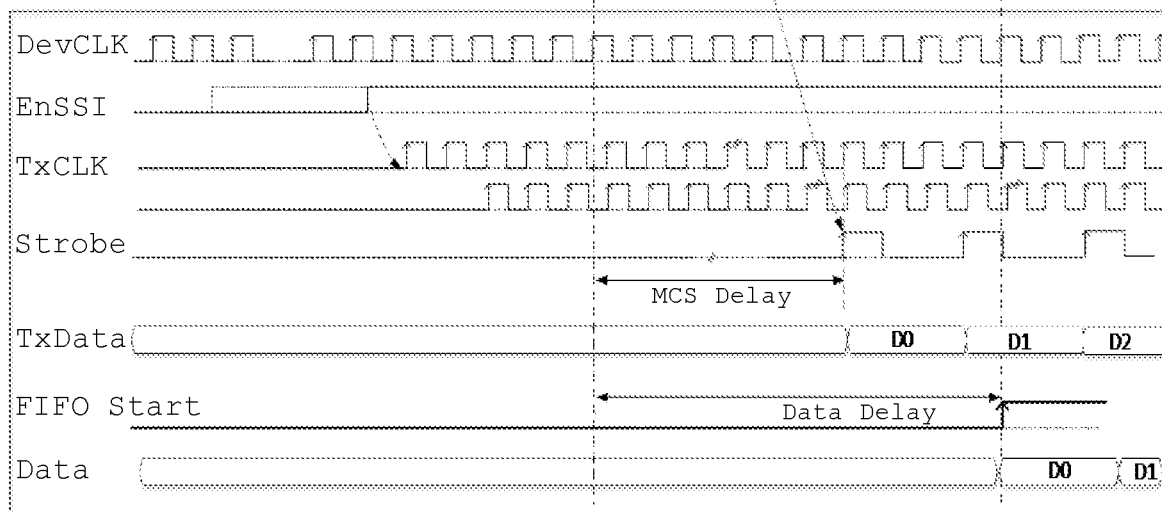

An example of signals involved in the Tx part of a digital front-end processor is shown in the signal diagram 500 of FIG. 5. The signal diagram 500 includes MCS related signals 502, signals 504 in a Tx part of a first digital front-end processor, such as the digital front-end processor 400 shown in FIG. 4, and signals 506 in a Tx part of a second digital front-end processor. The first and second digital frond end processor are typically parts of the same multi-antenna wireless communication system, e.g., multi-antenna wireless communication system 100 of FIG. 1. The present disclosure is not limited to multi-antenna wireless communication system including two Tx parts. There may be any number of Tx parts and any number of digital front-end processors.

There may be various MCS signals involved in triggering clock signals. E.g., as shown in FIG. 5, a first MCS signal MCS1 may trigger start of SSI interfaces by setting an enable SSI (depicted 'EnSSI' in FIG. 5) signal. The EnSSI signal may trigger the BBIC 150 to start the TxCLK signal. A second MCS signal MCS2 represents the MCS2 signal as received from MCS2 in FIG. 4.

In the first digital front-end processor 400 (i.e., signals 504), the Device CLK signal (depicted 'DevCLK' in FIG. 5) may be received from the CLK & MCS signal generator 102. When the MCS2 signal is received, an MCS delay may be applied, in this example a delay of two TxCLK pulses, after which the Strobe signal may be started. In synchronization with the Strobe signal, the TxData may be received from the BBIC 150 in the FIFO buffer 424, where the data samples D0, D1 and D2 will be buffered before being output.

In the second digital front-end processor (i.e., signals 506), the DevCLK signal may be received from the CLK & MCS signal generator 102. When the MCS2 signal is received, an MCS delay may be applied, in this example a delay of six TxCLK pulses, after which the Strobe signal may be started. In synchronization with the Strobe signal, the TxData may be received from the same BBIC 150 or another BBIC in another FIFO buffer 424, where the data samples D0 and D1 will be buffered before being output. Note that the Data and data samples D0 . . . D2 in the second digital front-end processor may be different from the Data and data sampled D0 . . . D2 in the first digital front-end processor.

In the example of FIG. 5, the data delay is the largest for the second digital front-end processor. The data delay to be applied to all Tx parts may therefore be based on the data delay in the second digital front-end processor. The data delay to be applied (depicted 'Data Delay' in FIG. 5) may be stored in the data delay memory 440. Each digital front-end processor may implement the data delay by enabling a FIFO Start signal, which triggers start of the Data signal in synchronization with a Strobe signal (not shown). As shown in FIG. 5, the Data signal may be synchronized among the digital front-end processors.

Example of Using Trigger Data

In some embodiments, the process of synchronizing output data of digital front-end processors may be triggered by trigger data present in input data to internal buffers of the digital front-end processors. For example, in FIG. 2 the Data signal from RxLSSI 222 to FIFO 224 may include the trigger data. For example, in FIG. 4 the TxData signal from the BBIC 150 to the FIFO 424 may include the trigger data. The digital front-end processor may be configured to detect the trigger data and start synchronizing the output data, such as RxData from FIFO 224 in FIG. 2 or Data from FIFO 224 in FIG. 4, after the trigger data has been detected.

The trigger data may be any recognizable data in the input data, e.g., an 8-bit, 16-bit, 32-bit or 64-bit character, or any data string including multiple of such characters.

In case of using trigger data, the signal diagram of FIGS. 3 and 5 may be adapted to include trigger data in the input data, e.g., in the Data signal in FIG. 3 or in the TxData signal in FIG. 5. The trigger data may be used in various manners together with a trigger signal, such as the MCS2 signal, to synchronize the output data between multiple digital front-end processors. In one example, only after the trigger data has been received the trigger signal may be processed as shown in FIGS. 3 and 5. In another example, the trigger signal may be processed as shown in FIGS. 3 and 5, but the output data may be further delayed to start after receiving the trigger data, while keeping the output data of the digital front-end processors in synchronization. In another example, the moment when the trigger data and the trigger signal have been received may trigger the start of the synchronization process, e.g., as shown in FIGS. 3 and 5 starting at the time of receipt of the MCS2 signal.

Figure 6:
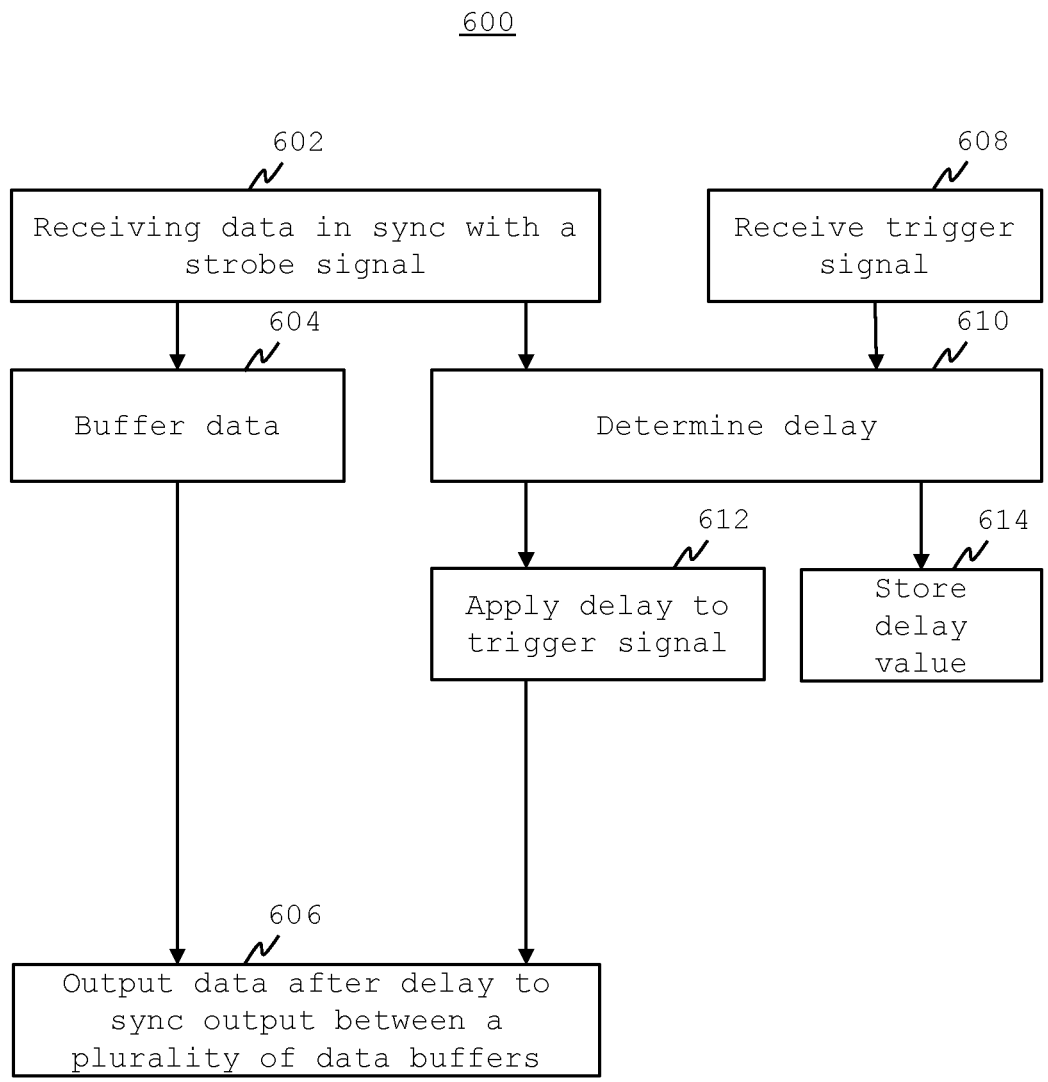
FIG. 6 shows a flow diagram of a method according to some embodiments of the present disclosure.

Example Method for Synchronizing Output of a Plurality of Data Buffers of Different Transmitter or Receiver Data Paths in a Multi-Antenna Wireless Communication System FIG. 6 shows an example of a method for synchronizing output of a plurality of data buffers of different transmitter or receiver data paths in a multi-antenna wireless communication system, according to some embodiments of the present disclosure. In step 602 data may be received in synchronization with a strobe signal, e.g., Strobe in FIG. 2 or Strobe in FIG. 4. In step 604 the received data may be buffered in a data buffer, such as FIFO buffer 224 in FIG. 2 or FIFO buffer 424 in FIG. 4. In step 606 the data may be output after a determined delay, wherein the delay is determined such that respective data is output at substantially the same time at the plurality of data buffers.

In step 608 a trigger signal, such as MCS2 in FIG. 2 and FIG. 4, may be received. In step 610 the delay may be determined based on the trigger signal and the data as received for the data buffers. In step 612 the delay may be applied to the trigger signal to obtain the determined delay for outputting the data from a data buffer. In step 614, a delay value representative of the delay may be stored in a data delay memory.

Example Data Processing System

Figure 7:
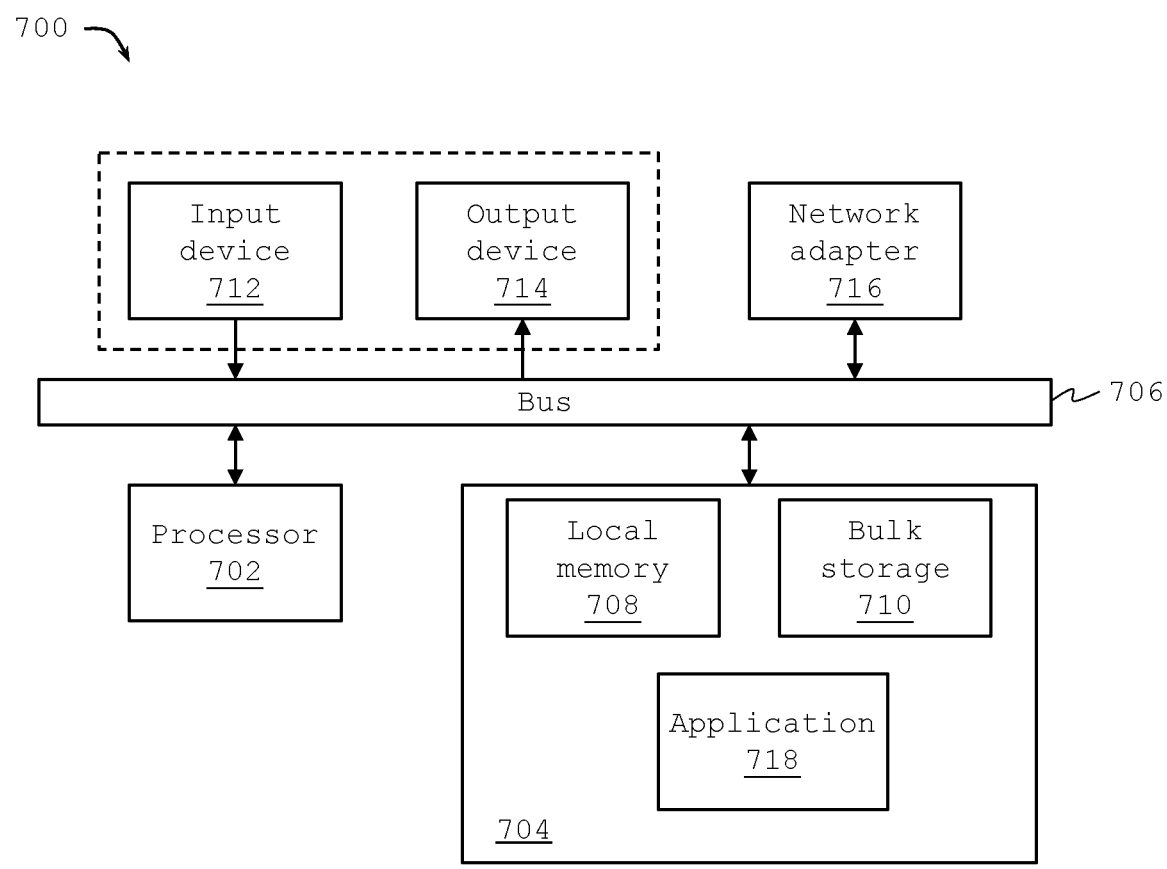
FIG. 7 provides a block diagram illustrating an example data processing system that may be configured to implement, or control, at least portions of operating a transceiver, according to some embodiments of the present disclosure.

FIG. 7 provides a block diagram illustrating an example data processing system 800 that may be configured to control operation of parts of a transceiver front-end, as described herein, according to some embodiments of the present disclosure. For example, the data processing system 800 may be configured to implement or control portions of operating parts of the transceiver device 160 as described with reference to FIG. 1, parts of the digital front-end processor 200 as described with reference to FIG. 2, or parts of the digital front-end processor 400 as described with reference to FIG. 4.

As shown in FIG. 7, the data processing system 800 may include at least one processor 802, e.g., a hardware processor 802, coupled to memory elements 804 through a system bus 806. For example, synchronization units 220, 420 may be implemented as a processor 802 and memories 240, 440 may be implemented as one or more memory elements 804. As such, the data processing system may store program code within memory elements 804. Further, the processor 802 may execute the program code accessed from the memory elements 804 via a system bus 806. In one aspect, the data processing system may be implemented as a computer that is suitable for storing and/or executing program code. It should be appreciated, however, that the data processing system 800 may be implemented in the form of any system including a processor and a memory that is capable of performing the functions described within this disclosure.

In some embodiments, the processor 802 can execute software or an algorithm to perform the activities as discussed in the present disclosure. The processor 802 may include any combination of hardware, software, or firmware providing programmable logic, including by way of non-limiting example a microprocessor, a DSP, a FPGA, a programmable logic array (PLA), an ASIC, or a virtual machine processor. The processor 802 may be communicatively coupled to the memory element 804, for example in a direct-memory access (DMA) configuration, so that the processor 802 may read from or write to the memory elements 804.

In general, the memory elements 804 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the data processing system 800 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Elements shown in the present figures can also include suitable interfaces for receiving, transmitting, and/or otherwise communicating data or information in a network environment so that they can communicate with, e.g., the data processing system 800.

In certain example implementations, mechanisms operating transceiver front-ends as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as the memory elements 804 shown in FIG. 7, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as the processor 802 shown in FIG. 7, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 804 may include one or more physical memory devices such as, for example, local memory 808 and one or more bulk storage devices 810. The local memory may refer to RAM or other non-persistent memory device(s) generally used during actual execution of the program code. A bulk storage device may be implemented as a hard drive or other persistent data storage device. The processing system 800 may also include one or more cache memories (not shown) that provide temporary storage of at least some program code in order to reduce the number of times program code must be retrieved from the bulk storage device 810 during execution.

As shown in FIG. 7, the memory elements 804 may store an application 818. In various embodiments, the application 818 may be stored in the local memory 808, the one or more bulk storage devices 810, or apart from the local memory and the bulk storage devices. It should be appreciated that the data processing system 800 may further execute an operating system (not shown in FIG. 7) that can facilitate execution of the application 818. The application 818, being implemented in the form of executable program code, can be executed by the data processing system 800, e.g., by the processor 802. Responsive to executing the application, the data processing system 800 may be configured to perform one or more operations or method steps described herein.

Input/output (I/O) devices depicted as an input device 812 and an output device 814, optionally, can be coupled to the data processing system. Examples of input devices may include, but are not limited to, a keyboard, a pointing device such as a mouse, or the like. Examples of output devices may include, but are not limited to, a monitor or a display, speakers, or the like. In some embodiments, the output device 814 may be any type of screen display, such as plasma display, liquid crystal display (LCD), organic light emitting diode (OLED) display, electroluminescent (EL) display, or any other indicator, such as a dial, barometer, or LEDs. In some implementations, the system may include a driver (not shown) for the output device 814. Input and/or output devices 812, 814 may be coupled to the data processing system either directly or through intervening I/O controllers.

In an embodiment, the input and the output devices may be implemented as a combined input/output device (illustrated in FIG. 7 with a dashed line surrounding the input device 812 and the output device 814). An example of such a combined device is a touch sensitive display, also sometimes referred to as a "touch screen display" or simply "touch screen". In such an embodiment, input to the device may be provided by a movement of a physical object, such as a stylus or a finger of a user, on or near the touch screen display.

A network adapter 816 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 800, and a data transmitter for transmitting data from the data processing system 800 to said systems, devices and/or networks. Modems, cable modems, and Ethernet cards are examples of different types of network adapter that may be used with the data processing system 800.

Select Examples

The following paragraphs provide various examples of the embodiments disclosed herein.

Example 1 provides a digital front-end processor, e.g., digital front-end processor 140, 200 or 400. The digital front-end processor may include one or more of a transmit channel and a receive channel. The digital front-end processor may include a data buffer, e.g., FIFO 224 or FIFO 424, to receive input data, e.g., Data in FIGS. 2-3 or TxData in FIGS. 4-5, for the one or more of the transmit channel and the receive channel in synchronization with a first strobe signal, e.g., Strobe in FIGS. 2-5. The data buffer may generate output data, e.g., RxData in FIGS. 2-3 or Data in FIGS. 4-5, based in the input data. The digital front-end processor may synchronize the output data with another output data of another data buffer of another digital front-end processor based on a data delay applied to the input data.

Example 2 provides a digital front-end processor according to example 1. The digital front-end processor may include a first input to receive a trigger signal, e.g., MCS2 in FIG. 3 or 5. The digital front-end processor may include a data delay memory, e.g., Data Delay memory 240 or 440, to store a data delay value representative of the data delay. The digital front-end processor may apply the data delay value to the trigger signal to obtain a timing of the output data.

Example 3 provides a digital front-end processor according to example 1. The digital front-end processor may apply a trigger delay to the trigger signal to obtain a delayed trigger time. The digital front-end processor may start the first strobe signal in synchronization at the delayed trigger time. The digital front-end processor may determine a timing of the output data further based on the delayed trigger time.

Example 4 provides a digital front-end processor according to example 3. The digital front-end processor may include a trigger signal delay memory, e.g., MCS delay memory 244 or 444, to store a trigger delay value representative of the trigger delay.

Example 5 provides a digital front-end processor according to example 3. The data buffer may start buffering the input data in synchronization with the first strobe signal after the delayed trigger time.

Example 6 provides a digital front-end processor according to example 3. The digital front-end processor may calculate a buffer delay based on the data delay and the trigger delay. The digital front-end processor may add the buffer delay to the trigger delay to obtain the timing of the output data.

Example 7 provides a digital front-end processor according to example 6. The digital front-end processor may include a buffer delay memory, e.g., FIFO delay memory 242 or 442, to store a buffer delay value indicative of the buffer delay.

Example 8 provides a digital front-end processor according to example 1. The input data may include a trigger data. The digital front-end processor may synchronize the output data after receiving the trigger data.

Example 9 provides a digital front-end processor according to example 1. The digital front-end processor may generate a second strobe signal, e.g., RxStrobe in FIGS. 2-3. The digital front-end processor may output the output data in synchronization with the second strobe signal.

Example 10 provides a digital front-end processor according to example 1. The digital front-end processor may include a logic circuit, e.g., AND Logic 226 or 426, to determine a timing of the output data. The data buffer may receive the timing of the output data from the logic circuit.

Example 11 provides a digital front-end processor according to example 1. The data buffer may be a FIFO data buffer, e.g., FIFO 224 or FIFO 424.

Example 12 provides a multi-antenna wireless communication system, e.g., multi-antenna wireless communication system 100. The multi-antenna wireless communication system may include a baseband processor, e.g., BBIC 150. The multi-antenna wireless communication system may include a transceiver device, e.g., transceiver device 160, to exchange data with the baseband processor. The multi-antenna wireless communication system may include a RF unit, e.g., RF unit 120, to transmit the data. The transceiver device may include plurality of digital front-end processors. Examples of a digital front-end processor are digital front-end processor 140, 200 and 400. Each digital front-end processor may include a data buffer, e.g., FIFO 224 or FIFO 424. The data buffer may buffer data in one of a transmitter data path and a receiver data path. The digital front-end processor may synchronize output data from the data buffer between the plurality of the digital front-end processors.

Example 13 provides a multi-antenna wireless communication system according to example 12. The transceiver device may be communicatively coupled to the baseband processor by an SSI.

Example 14 provides a multi-antenna wireless communication system according to example 12. The digital front-end processor may include an input to receive a trigger signal, e.g., MCS2 in FIG. 3 or 5. The digital front-end processor may include a data delay memory, e.g., Data Delay memory 240 or 440, to store a data delay value representative of a data delay. The digital front-end processor may output a buffer start signal, e.g., FIFO Start in FIG. 3 or 5, based on the data delay value applied to the trigger signal to start output of the data from the data buffer in the plurality of digital front-end processors.

Example 15 provides a multi-antenna wireless communication system according to example 14. The digital front-end processor may include an input for receiving a trigger delay value representative of a trigger delay. The digital front-end processor may apply the trigger delay to the trigger signal to obtain a delayed trigger signal and start buffering of data based on the delayed trigger signal.

Example 16 provides a multi-antenna wireless communication system according to example 12. The baseband processor may be implemented as an integrated circuit, e.g., an ASIC.

Example 17 provides a multi-antenna wireless communication system according to example 12. The transceiver device may be implemented as an integrated circuit, e.g., an ASIC.

Example 18 provides a method for synchronizing output data, e.g., RxData in FIGS. 2-3 or Data in FIGS. 4-5, of a data buffer, e.g., FIFO 224 or FIFO 424, of a digital front-end processor, e.g., digital front-end processor 140, 200 or 400, with other output data of another data buffer of another digital front-end processor. The method may include receiving input data, e.g., Data in FIGS. 2-3 or TxData in FIGS. 4-5, in synchronization with a strobe signal, e.g., Strobe in FIGS. 2-5. The method may include buffering the input data. The method may include generating the output data after a delay. The output data may be based on the input data. The delay may be determined such that the output data is synchronized with the other output data.

Example 19 provides a method according to example 18. The method may include receiving a trigger signal, e.g., MCS2 in FIG. 3 or 5. The method may include obtaining a trigger delay value representative of a trigger delay from a trigger signal delay memory, e.g., MCS delay memory 244 or 444. The method may include applying the trigger delay to the trigger signal to determine the delay.

Example 20 provides a method according to example 18. The input data may include a trigger data. The method may include synchronizing the output data with the other output data after receiving the trigger data.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

It is also imperative to note that all of the specifications, dimensions, and relationships outlined herein (e.g., the number of modules/systems, logic operations, etc.) have only been offered for purposes of example and teaching only. Such information may be varied considerably without departing from the spirit of the present disclosure, or the scope of the appended claims. The specifications apply only to some non-limiting examples and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the drawings may be combined in various possible configurations, all of which are clearly within the broad scope of the present disclosure.

Note that in the present description, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

The invention claimed is:

1. A digital front-end processor comprising:
one or more communication channels comprising at least one of a transmit channel or a receive channel;
a data buffer to receive input data for the one or more communication channels in synchronization with a first strobe signal and generate output data, wherein the output data is based on the input data;
a first input to receive a trigger signal; and
a data delay memory to store a data delay value representative of a data delay,
wherein the digital front-end processor is to apply the data delay value to the trigger signal to obtain a timing of the output data, and
wherein the digital front-end processor is to synchronize the output data with another output data of another data buffer of another digital front-end processor based on the data delay applied to the input data.

2. The digital front-end processor according to claim 1, wherein the input data comprises a trigger data, and wherein the digital front-end processor is to synchronize the output data after receiving the trigger data.

3. The digital front-end processor according to claim 1, wherein the digital front-end processor is to:
generate a second strobe signal; and
output the output data in synchronization with the second strobe signal.

4. The digital front-end processor according to claim 1, further comprising a logic circuit to determine a timing of the output data, and wherein the data buffer is to receive the timing of the output data from the logic circuit.

5. The digital front-end processor according to claim 1, wherein the data buffer is a first-in-first-out data buffer.

6. The digital front-end processor according to claim 1, wherein the digital front-end processor is a complementary metal oxide semiconductor low voltage differential signaling based digital front-end processor.

7. A digital front-end processor comprising:
one or more communication channels comprising at least one of a transmit channel or a receive channel; and
a data buffer to receive input data for the one or more communication channels in synchronization with a first strobe signal and generate output data, wherein the output data is based on the input data,
wherein the digital front-end processor is to:
apply a trigger delay to a trigger signal to obtain a delayed trigger time;
start the first strobe signal in synchronization at the delayed trigger time;
determine a timing of the output data further based on the delayed trigger time; and
synchronize the output data with another output data of another data buffer of another digital front-end processor based on a data delay applied to the input data.

8. The digital front-end processor according to claim 7, further comprising:
a first input to receive a trigger signal; and
a data delay memory to store a data delay value representative of the data delay, and
wherein the digital front-end processor is to apply the data delay value to the trigger signal to obtain a timing of the output data.

9. The digital front-end processor according to claim 7, further comprising a trigger signal delay memory to store a trigger delay value representative of the trigger delay.

10. The digital front-end processor according to claim 7, wherein the data buffer is to start buffering the input data in synchronization with the first strobe signal after the delayed trigger time.

11. The digital front-end processor according to claim 7, wherein the digital front-end processor is to calculate a buffer delay based on the data delay and the trigger delay, and wherein the digital front-end processor is to add the buffer delay to the trigger delay to obtain the timing of the output data.

12. The digital front-end processor according to claim 11, further comprising a buffer delay memory to store a buffer delay value indicative of the buffer delay.

13. The digital front-end processor according to claim 7, wherein the digital front-end processor is a low voltage differential signaling based digital front-end processor.

14. A multi-antenna wireless communication system, comprising:
a baseband processor;
a transceiver device to exchange data with the baseband processor; and
a radio frequency unit to transmit the data,
wherein the transceiver device comprises a plurality of digital front-end processors, wherein each digital front-end processor comprises a data buffer,
wherein the data buffer is to buffer data in one of a transmitter data path and a receiver data path, and
wherein the plurality of digital front-end processors comprise a first digital front-end processor, wherein the first digital front-end processor comprises an input to receive a trigger signal and a data delay memory to store a data delay value representative of a data delay, and wherein the first digital front-end processor is to output a buffer start signal based on the data delay value applied to the trigger signal to start output of the data from the data buffer.

15. The multi-antenna wireless communication system according to claim 14, wherein the transceiver device is communicatively coupled to the baseband processor by a synchronous serial interface.

16. The multi-antenna wireless communication system according to claim 12, wherein the first digital front-end processor comprises an input for receiving a trigger delay value representative of a trigger delay, and wherein the first digital front-end processor is to apply the trigger delay to the trigger signal to obtain a delayed trigger signal and start buffering of data based on the delayed trigger signal.

17. The multi-antenna wireless communication system according to claim 14, wherein the baseband processor is implemented as an integrated circuit.

18. The multi-antenna wireless communication system according to claim 14, wherein the transceiver device is implemented as an integrated circuit.

19. A method for synchronizing output data of a data buffer of a digital front-end processor with other output data of another data buffer of another digital front-end processor, the method comprising:
receiving input data in synchronization with a strobe signal;
buffering the input data;
receiving a trigger signal;
obtaining a trigger delay value representative of a trigger delay from a trigger signal delay memory;
applying the trigger delay to the trigger signal to determine a delay; and
generating the output data after the delay, wherein the output data is based on the input data, and wherein the delay is determined such that the output data is synchronized with the other output data.

20. The method according to claim 19, wherein the input data comprises a trigger data, the method further comprising synchronizing the output data with the other output data after receiving the trigger data.

* * * * *

UNITED STATES PATENT AND TRADEMARK OFFICE
CERTIFICATE OF CORRECTION

| | | |
|---|---|---|
| PATENT NO. | : 12,432,000 B2 | Page 1 of 1 |
| APPLICATION NO. | : 18/021363 | |
| DATED | : September 30, 2025 | |
| INVENTOR(S) | : Hakim Saheb | |

It is certified that error appears in the above-identified patent and that said Letters Patent is hereby corrected as shown below:

In the Claims

Column 18, Claim 16, Line 20, delete "claim 12, wherein" and insert -- claim 14, wherein --.

Signed and Sealed this
Tenth Day of February, 2026

John A. Squires
*Director of the United States Patent and Trademark Office*